(12) United States Patent
Ajanovic

(10) Patent No.: US 6,199,127 B1
(45) Date of Patent: *Mar. 6, 2001

(54) METHOD AND APPARATUS FOR THROTTLING HIGH PRIORITY MEMORY ACCESSES

(75) Inventor: Jasmin Ajanovic, Folsom, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,407

(22) Filed: Dec. 24, 1997

(51) Int. Cl.⁷ .................................................. G06F 13/00
(52) U.S. Cl. .................... 710/100; 710/100; 710/116; 710/123; 711/100; 711/150
(58) Field of Search ............................... 710/100, 40, 41, 710/45, 111, 36, 116, 123, 244; 711/100, 151

(56) References Cited

U.S. PATENT DOCUMENTS

| | | | |
|---|---|---|---|
| 4,829,467 | * 5/1989 | Ogata | 710/244 |
| 5,621,898 | * 4/1997 | Wooten | 709/117 |
| 5,634,131 | * 5/1997 | Matter et al. | 709/310 |
| 5,652,894 | * 9/1995 | Hu et al. | 709/310 |
| 5,756,027 | * 5/1998 | Rothschild et al. | 709/40 |
| 5,809,278 | * 9/1998 | Watanabe et al. | 426/98 |
| 5,884,027 | * 4/1999 | Garbus et al. | 709/250 |
| 5,898,876 | * 4/1999 | James | 709/251 |

* cited by examiner

Primary Examiner—Ario Etienne
Assistant Examiner—Firmin Backer
(74) Attorney, Agent, or Firm—Jeffrey S. Draeger

(57) ABSTRACT

A method and apparatus for throttling high priority memory accesses. An apparatus of the present invention includes an arbiter circuit and a throttling circuit. The arbiter circuit is coupled to receive first and second types of memory access commands and has a preference for the first type of memory access commands. The throttling circuit is coupled to the arbiter and can at least temporarily reduce the preference for the memory access commands of the first type.

22 Claims, 4 Drawing Sheets

METHOD AND APPARATUS FOR THROTTLING HIGH PRIORITY MEMORY ACCESSES

BACKGROUND OF THE INVENTION

1. Field of the Invention

The present invention pertains to the field of memory access in a computing or other processing system. More particularly, the present invention pertains to the field of throttling, or reducing the throughput of, high priority accesses to memory.

2. Description of Related Art

Overall computer system performance may be enhanced by ensuring that all devices in the system which need to gain access to shared resources can do so. If regular access is not ensured, unchecked monopolization of system resources may result. Such monopolization may undesirably sacrifice the performance of components and/or applications which experience more limited access to certain resources. For example, if graphics processing is allowed to monopolize memory access, other peripheral devices or even a central processing unit may be unable to gain sufficient memory access to maintain reasonable performance during the graphics processing.

Many prior art arbitration techniques are designed to avoid bus agent "starvation" (i.e., the bus agent having its functions significantly limited by its inability to access a resource). Such techniques include the use of round-robin or time-sliced scheduling which allows each requesting bus agent access to utilize a resource for a certain amount of time or for a certain number of transactions. Other prior art techniques may implement round robin scheduling in a more elaborate fashion, giving certain bus agents larger time slices or larger numbers of transactions.

Some arbitration algorithms, however, allow certain high priority transactions to take precedence over other types of transactions which seek access to a particular resource. For example, a device making a high priority memory access request may be granted access to memory regardless of other pending requests for memory access. Such preferred access may be prone to abuse if left unchecked. For example, a device that exclusively or extensively utilizes high priority memory access commands may exhibit impressive performance; however, the performance of other devices utilizing lower priority memory access commands may be impacted. As referred to herein, the terms command or memory access command may be used to indicate any type of request signal or command which indicates that a device is requesting that some transaction with memory be performed.

One example of a bus protocol that includes high priority memory access commands which may take precedence over other memory access commands is described in the Accelerated Graphics Port (A.G.P.) Interface Specification, Revision 1.0, Jul. 31, 1996, available from Intel Corporation of Santa Clara, Calif. The A.G.P. specification defines a protocol that uses a set of commands to provide high bandwidth transactions between a bus master (typically a graphics accelerator) and main memory. The transactions include normal and high priority read and write commands of varying lengths.

The high priority A.G.P. commands (also known as expedite commands) may be either reads or writes, either of which can take precedence over other system memory access commands. For example, a typical system includes an arbiter (often located in a component commonly known as a "north bridge") to arbitrate access to system memory. The arbiter receives memory access commands from one or more processors on a host bus. The arbiter also receives memory access commands from devices on a peripheral components interconnect (PCI) bus, as well as A.G.P. commands from an A.G.P. device. A.G.P. expedite commands are typically given priority over PCI and host bus memory requests according to the A.G.P. specification. The PCI bus is described by the PCI Specification available from the PCI Special Interest Group (SIG) in Hillsboro, Oreg.

Abuse of this preference for A.G.P. expedite commands may adversely affect overall system performance. For example, a system vendor wishing to showcase graphics performance may allow a graphics processor connected via the A.G.P. port to use expedite commands for many different types of transactions. While graphics performance may improve, other applications may suffer considerably, especially when such other applications are executed in a multi-tasking environment with graphically intensive applications. Thus, a graphics benchmark may be bolstered, while the overall system appeal may suffer due to lackluster performance in other categories.

Accordingly, a need exists to reduce the probability that a particular monopolistic bus agent capable of making high priority requests will unduly impact system performance. The prior art does not provide a mechanism to throttle high priority memory accesses to preserve system performance. In other words, the prior art lacks a mechanism to control the percentage of memory accesses which are high priority memory accesses in a system where such high priority memory accesses normally are preferred over other memory accesses. Such overriding of the preference for high priority commands may help ensure proper system performance across a variety of applications.

SUMMARY

A method and apparatus for throttling high priority memory accesses is disclosed. An apparatus of the present invention includes an arbiter circuit and a throttling circuit. The arbiter circuit is coupled to receive first and second types of memory access commands and has a preference for the first type of memory access commands. The throttling circuit is coupled to the arbiter and can at least temporarily reduce the preference for the memory access commands of the first type.

BRIEF DESCRIPTION OF THE FIGURES

The present invention is illustrated by way of example and not limitation in the figures of the accompanying drawings.

DETAILED DESCRIPTION

The present invention provides a method and apparatus for throttling high priority memory accesses. In the following description, numerous specific details such as particular register arrangements, signal names, and command throttling waveforms are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

According to the present invention, overall system performance may be preserved by throttling high priority access commands which would normally take precedence over other memory access commands. Thus, the present invention may also allow the other memory access commands to be executed more rapidly. Such throttling may prevent an otherwise monopolistic or dominating bus agent from unduly limiting access to memory for other bus agents, and therefore may allow other bus agents to maintain reasonable performance levels.

Figure 1:
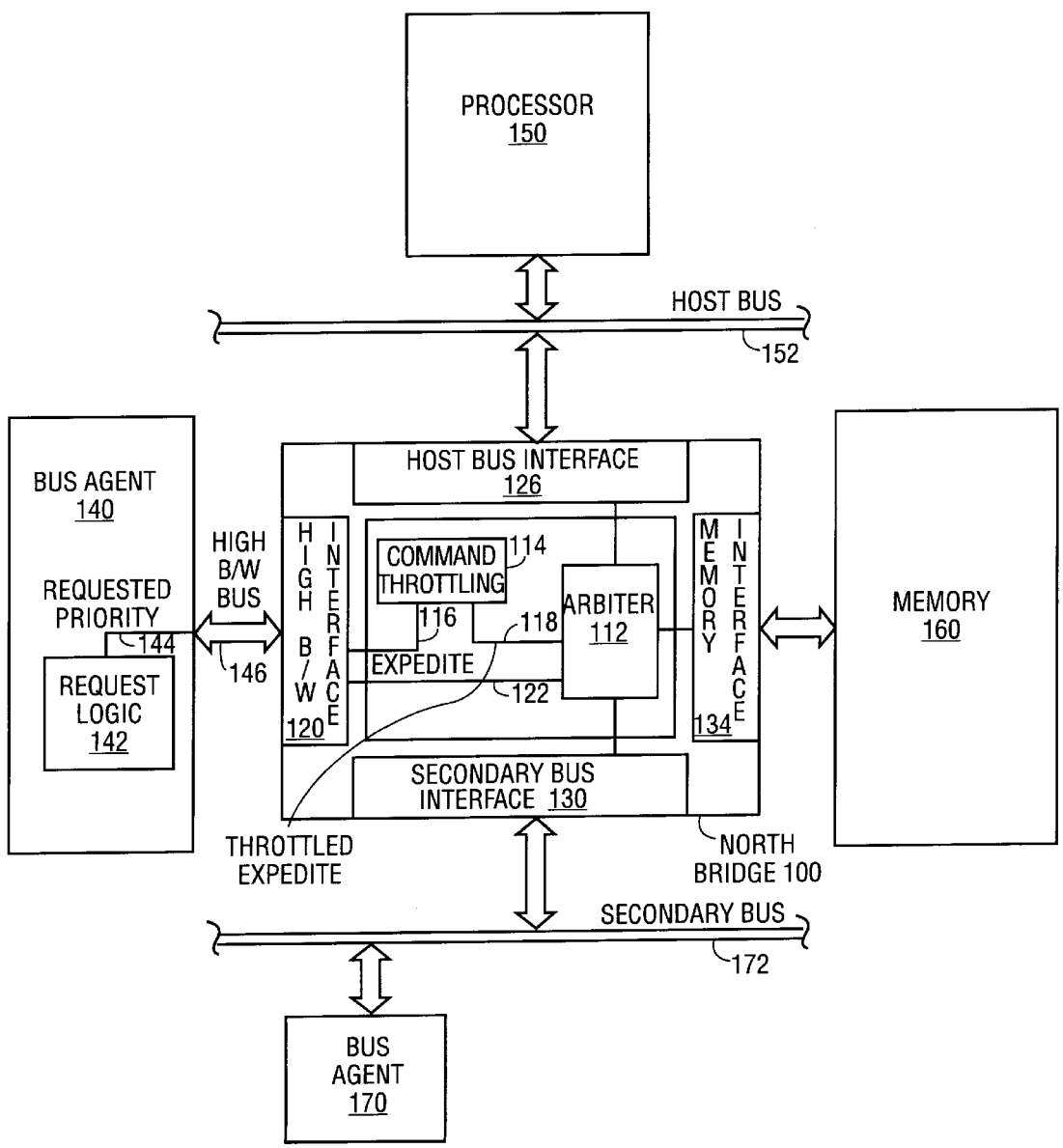
FIG. 1 illustrates one embodiment of a system of the present invention.

FIG. 1 illustrates one embodiment of a system of the present invention. In this embodiment, a north bridge circuit 100 contains a command re-prioritization circuit 110 which can throttle high priority memory access commands from a bus agent 140. Such throttling may allow a processor 150 or a second bus agent 170 access to the memory 160 when the high priority commands from the bus agent 140 would otherwise gain such access. The bus agent 140 may generate such memory access commands in conjunction with any type of digital signal processing performed. For example, the bus agent 140 may process graphics, images, audio, or other digital signals.

In the embodiment shown, the north bridge circuit 100 controls access to several buses. A host bus interface 126 is coupled to control access to a host bus 152 and may also arbitrate between the processor 150 and other bus agents which may be coupled to the host bus 152 (e.g., cache memory, other processors, or other suitable host bus agents). Memory access commands from the processor 150 and other host bus agents are received by the host bus interface 126 and passed to an arbiter 112 in the command re-prioritization circuit 110 via a bus 128. The arbiter 112 selects a memory access command to be executed and communicates with the memory 160 via a memory interface circuit 134.

A secondary bus interface circuit 130 controls access to a secondary bus 172. Memory access commands from the bus agent 170 and any other bus agents on the secondary bus 172 are passed to the secondary bus interface circuit 130 via the secondary bus 172. The secondary bus interface circuit 130 passes such commands to the arbiter 112 via a bus 132 for eventual execution via the memory interface circuit 134. The secondary bus 172 may be coupled to a variety of peripheral components and may also be coupled to one or more other buses. In one embodiment, the secondary bus 172 is a peripheral components interface (PCI) bus substantially in compliance with the PCI Specification. In some embodiments where the secondary bus 172 is a PCI bus, the secondary bus interface circuit 130 may form a part of or be closely linked to the host bus interface circuit 126. This may be the case if the cycles from the PCI bus are to be snooped on the host bus 152 due to cache memories available on the host bus 152 (e.g., in the processor 150).

A high bandwidth interface 120 controls interaction with the bus agent 140 over a high bandwidth bus 146. Since the bus agent 140 is engaged in high bandwidth activities (i.e., activities involving the processing of relatively large quantities of data compared to some other bus agents in the system), the bus agent 140 includes request logic 142 which is capable of at least making high priority requests by requesting an appropriate priority level via signal line(s) 144. Typically, the request logic 142 is capable of requesting commands with different priorities such that the high bandwidth bus 146 can be used for normal priority and high priority commands.

Memory access command information from the bus agent 140 is passed to the arbiter 112 via a bus 122. The presence of a high priority memory access command is indicated to the arbiter 112 with the assertion of an expedite signal on a signal line 116 by the high bandwidth interface circuit 120. Under appropriate conditions, a command throttling circuit 114 may throttle the expedite signal to generate a throttled expedite signal on the signal line 118. In other cases, the expedite signal is not throttled, but rather is passed through to the arbiter on the signal line 118.

One objective of such throttling is to prevent the bus agent 140 from abusing of the high priority memory access commands which the bus agent 140 is permitted to make. Typically, the arbiter 112 gives such commands a preference to other memory access commands. In fact, in some embodiments, the arbiter 112 always selects high priority commands despite there being other commands pending. For example, the arbiter may select a high priority command from the bus agent 140 even though a command from the processor 150 or the bus agent 170 is also concurrently available to the arbiter 112.

In other embodiments, multiple priority levels may be used throughout the system. In such embodiments, priority levels from one or more bus agents may be altered according to techniques of the present invention to allow lower priority commands to be executed. Furthermore, priority levels for bus agents perceived to be monopolizing bus usage may be throttled back by one or more priority levels in order to facilitate memory access by other bus agents.

When the command throttling circuit 114 throttles expedited (high priority) commands, other devices are able to gain access to the memory 160. Thus, the relative preference for high priority commands is reduced when the command throttling circuit 114 is active. With the expedite signal masked on signal line 118, the arbiter 112 may view an expedited command as a normal priority command. The arbiter 112 then can select a non-high priority command since it appears that there are no high priority commands pending. In other words, despite there being high priority commands concurrently available with normal priority commands for selection by the arbiter, normal priority commands may be selected. Notably, high priority write commands received but whose data has not been received are not considered to be concurrently available because they cannot be executed until the data is received (i.e., these commands may not be visible to the arbiter 112 until the data is received).

The command throttling circuit 114 throttles high priority commands only when it is enabled. In some embodiments, this circuit may be continuously enabled; however, in other embodiments, an expedite throttle mode may only be entered under certain conditions. For example, the user may enable or disable the throttling mode, or the throttling mode may be enabled only when a certain threshold of expedite command usage is reached.

Figure 2:
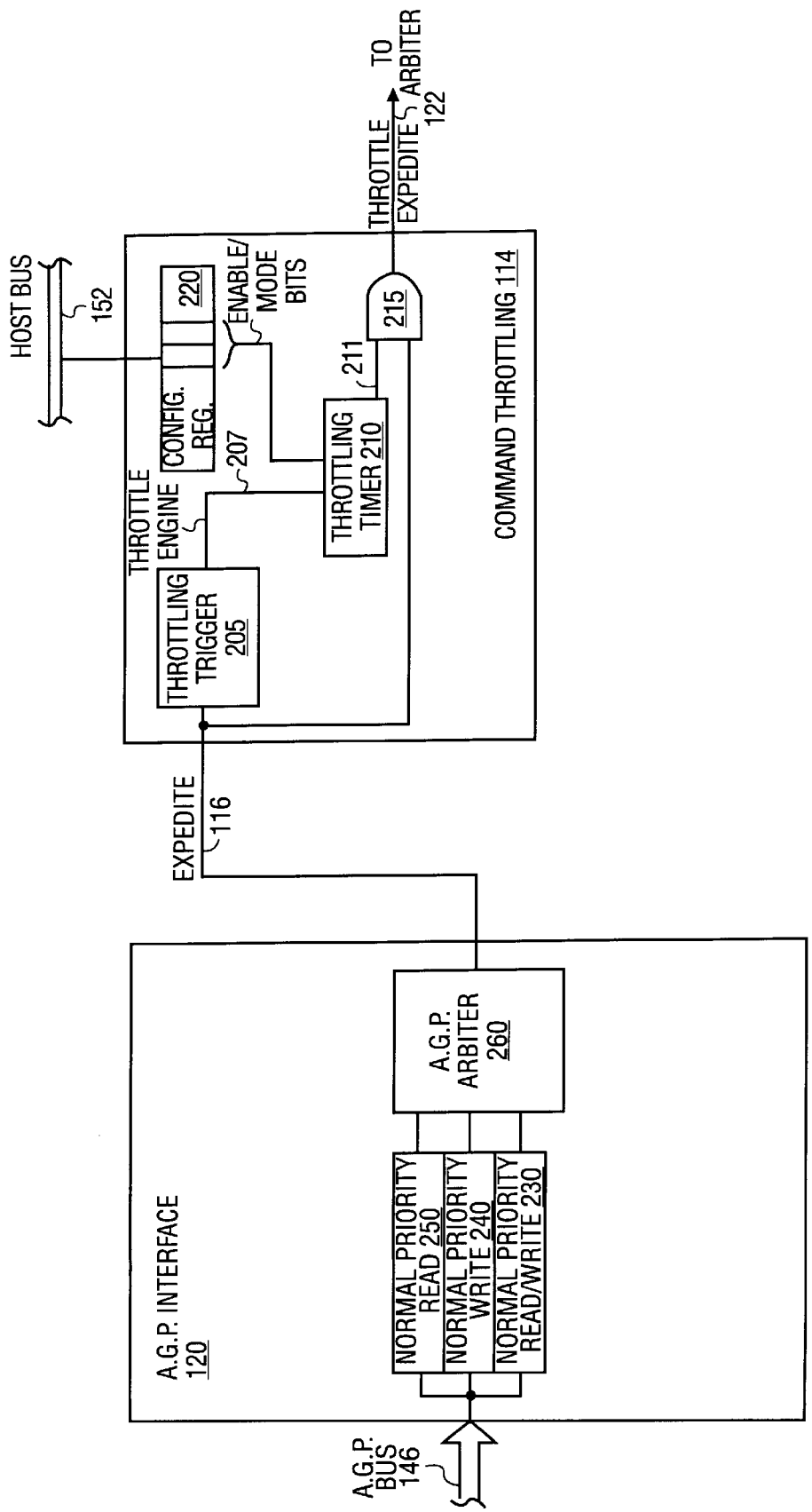
FIG. 2 illustrates details of one embodiment of the command re-prioritization circuit 110 of FIG. 1.

FIG. 2 illustrates details of an embodiment which includes circuitry to control when the throttling mode is enabled. A throttling trigger circuit 205 and a configuration register 220 having enable and mode control bits both may be used to control when the command throttling circuit 114 is active. The configuration register may be written to via the host bus 152. Thus, a user, an operating system, or a basic input/output system may control when throttling is enabled (i.e., when the circuitry is in an expedite throttle mode).

In the embodiment of FIG. 2, the throttled expedite signal is generated via an AND gate 215 which masks the expedite signal when a throttling timer 210 outputs an active low signal. Thus, when throttling is not enabled, the throttling timer 210 outputs an active high signal such that the expedite signal is passed through to the signal line 122 without logical modification. Alternatively, other logical structures using different combinations of gates and/or different polarities of signals may be used.

The throttling timer 210 may be enabled or disabled by the throttling trigger circuit 205. The throttling trigger circuit 205 may employ a counter or other device to detect a minimum number of occurrences or a minimum frequency of expedite commands before the throttling timer 210 is enabled. The throttling trigger circuit 205 may also disable the throttling timer 210 once the frequency of expedite requests decreases. In one embodiment, however, the throttling trigger circuit 205 may trigger (enable) the throttling timer 210 after the first expedite command and leave the throttling timer 210 enabled.

The throttling timer may also be controlled by one or more bits in the configuration register 220. For example, the configuration register may have a single bit which enables or disables the throttling timer 210. Alternatively, the configuration register 220 could include sufficient bits to specify a throttling off and throttling on time which respectively indicate the duration which a throttling signal on the signal line 211 is high (throttling off, expedite unmasked) and low (throttling on, expedite masked). An intermediary approach may also be taken, whereby several bits in the configuration register specify one of a predetermined set of waveforms and/or frequencies for the waveform of the throttling signal on signal line 211. Such an intermediate approach may simplify design verification by reducing the total number of test cycles necessary to exhaustively or otherwise adequately test the design. In one embodiment, two bits may be used in the configuration register according to the following table:

TABLE 1

| Configuration Bits | Throttling Mode |
| --- | --- |
| 00 | Throttling Disabled |
| 01 | 96 Clocks Throttling On; 32 Clocks Throttling Off |
| 10 | 192 Clocks Throttling On; 64 Clocks Throttling Off |
| 11 | 384 Clocks Throttling On; 128 Clocks Throttling Off |

FIG. 2 also illustrates that the high bandwidth bus 146 may be an A.G.P. bus and the high bandwidth interface 120 accordingly an A.G.P. interface. In one embodiment, the A.G.P. interface also contains three separate command queues, a normal priority read queue 250, a normal priority write queue 240, and a high priority read and write queue 230. An A.G.P. arbiter 260 selects commands from these three queues and prefers high priority reads and writes when such are ready for execution.

When high priority A.G.P. commands are available in the high priority read and write queue 230, the A.G.P. arbiter 260 asserts the A.G.P. expedite signal on the signal line 116.

In this embodiment, the arbiter 112 of the north bridge 100 (see FIG. 1) selects high priority A.G.P. commands over other available commands in compliance with the A.G.P. specification. Thus, A.G.P. expedite commands are selected despite other pending commands from the host bus 152 (e.g., from the processor 150) or from the secondary bus 172 (e.g., from the bus agent 170).

In the A.G.P. environment, this strong preference for high priority A.G.P. commands, without throttling, could result in the processor 150 or the bus agent 170 only gaining limited access to the memory. The throttling of A.G.P. expedite commands according to the present invention may help ameliorate this problem.

Figure 3:
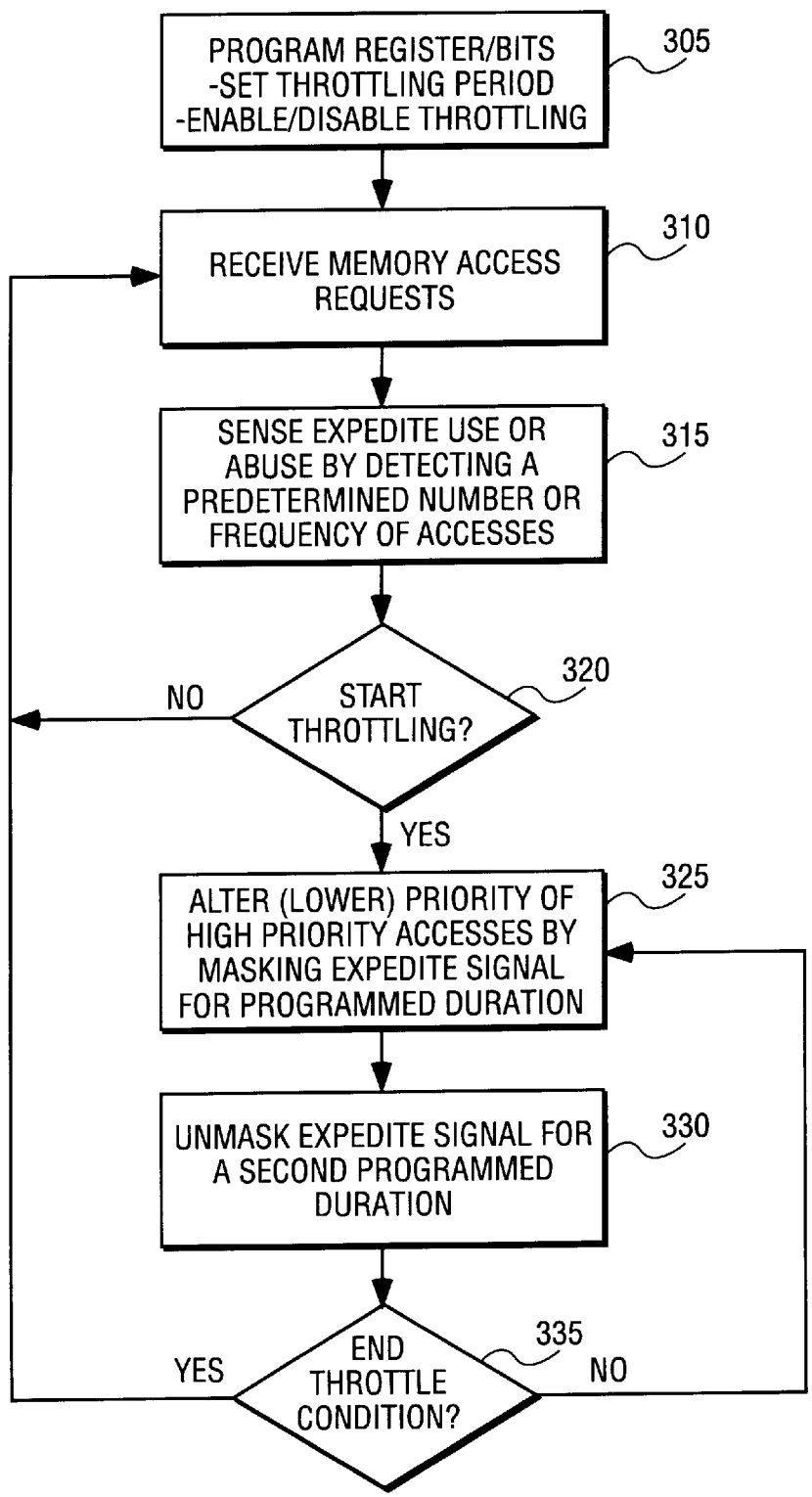
FIG. 3 illustrates a method for enabling and performing command throttling according to one embodiment of the present invention.

In FIG. 3, one embodiment of a method or process for enabling and performing throttling is shown. In step 305, control bits in the configuration register 220 are programmed. These bits may set the throttling period and/or enable or disable throttling entirely. The use and programming of configuration registers is well known, and any available technique such as programming a PCI configuration space register, may be used.

In step 310, memory access commands are received. In the embodiment of FIG. 1, the north bridge 100 receives such commands from any or all of the host bus interface 126, the high bandwidth bus interface 120, and the secondary bus interface 130. The command re-prioritization circuit 110 (and specifically the throttling trigger circuit 205 in the embodiment of FIG. 2) then senses whether the expedite commands are being used and/or abused as shown in step 315. As previously mentioned, use may be detected (i.e., even a singular expedite command) or alternatively a specified frequency or number of uses may be detected.

In step 320, a decision based on step 315 is made whether or not to begin throttling. If the throttling is not triggered by the commands received in step 310, the method returns to step 310 where more commands are received and the process repeated. If throttling was triggered, the priority of high priority commands is altered (lowered) in a relative sense with respect to other commands. In other words, either the priority of the high priority commands may be lowered or the priority of normal priority commands could equivalently be raised. In one embodiment, the priority of high priority access commands is lowered by masking the expedite signal, thereby effectively eliminating the high priority status. This masking may last for a programmed duration set according to Table 1.

In step 330, the expedite signal is unmasked for a second programmed duration (again see Table 1). As indicated in step 335, the throttling may be disabled if a throttle ending condition occurs. For example, the throttling trigger circuit 205 in FIG. 2 may disable the throttling timer 210 after the frequency of expedite commands drops below a certain level. Other embodiments may permanently enable the throttling once it is triggered, or may only disable throttling when the system is reset and/or configuration registers are changed.

If throttling is ended, the method returns to step 310 where memory access commands are again being received with the potential to thereafter re-enter the throttling mode. If throttling continues, the method returns to step 325 where the priority of high priority accesses is again altered. Thus, in both cases, the preference for high priority commands is at least temporarily reduced. Where the throttling continues, the preference for high priority commands is periodically reduced or in some embodiments periodically eliminated.

Figure 4:
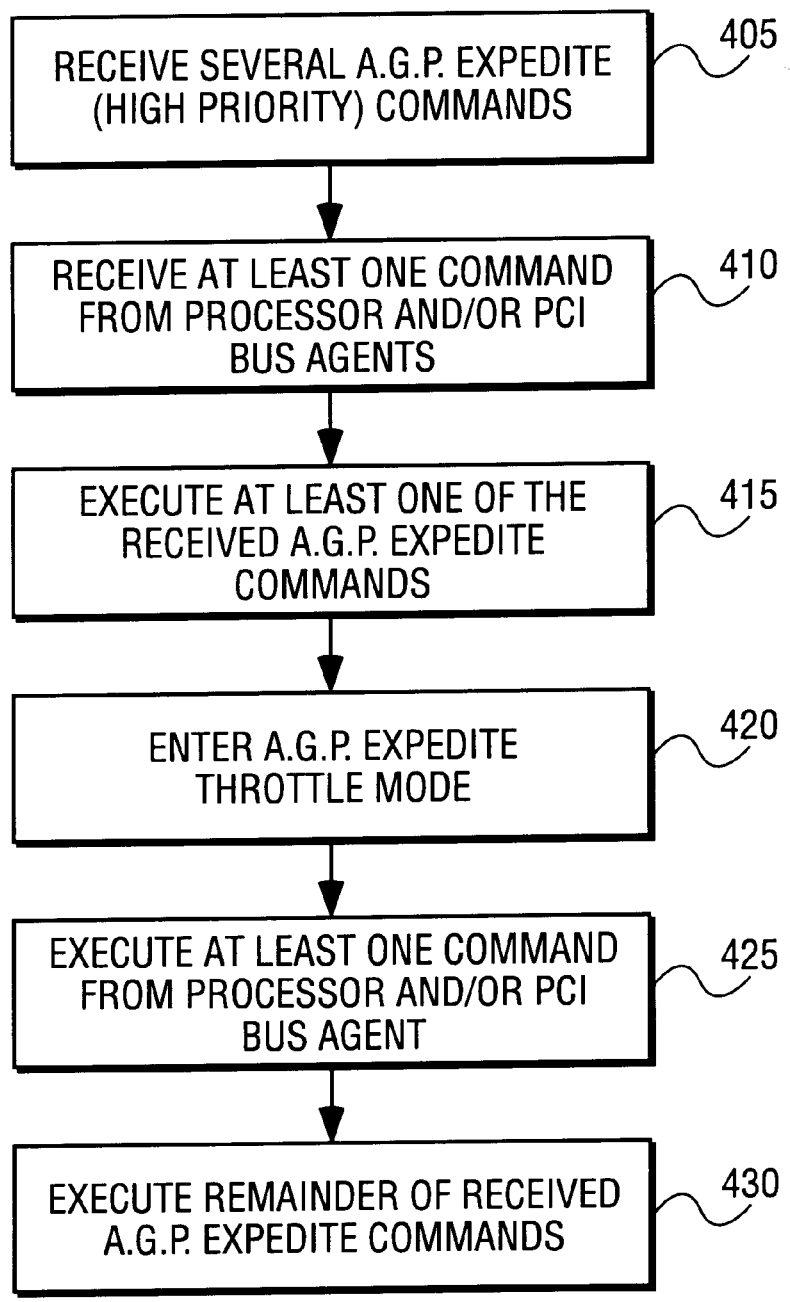
FIG. 4 illustrates one embodiment of a method of the present invention for throttling high priority A.G.P. commands when a particular sequence of memory access commands is received.

FIG. 4 illustrates events occurring when a particular sequence of memory access requests is received by one embodiment which throttles high priority A.G.P. commands. In some embodiments, this sequence of events may be observed via bus transactions between the north bridge 100 and other system components such as the memory 160 and the processor 150 and/or the bus agent 170 in FIG. 1.

In step 405, several A.G.P. expedite commands are received. Thereafter, in step 410, at least one command is received from the processor 150 and/or a PCI bus agent (which bus agent 170 may be). Normally, according to the A.G.P. protocol, A.G.P. expedite commands are given priority over other PCI or host bus commands; however, the interface circuitries associated with the various buses may complicate matters slightly.

For example, the high bandwidth interface 120 may be an A.G.P. interface which includes command queues as illustrated in FIG. 2. The host bus and secondary interface circuits 126 and 130 also contain circuitry which may result in a latency before a request is received by the arbiter 112. Even with these interface circuits, at least one of the received A.G.P. expedite commands is received and available to the arbiter 112 in time to be executed prior to the at least one other command from the processor or the PCI bus agent according in the sequence shown in FIG. 4.

A throttling mode, simply meaning that the north bridge 100 has begun A.G.P. expedite throttling, is entered in step 420. The illustrated sequence of events is only one exemplary sequence which indicates that such a throttling mode has been entered from the bus transactions. Many other possible sequences are possible given the throttling circuit functionality discussed herein. In step 425 the at least one command from the processor or the PCI bus agent is executed before the remainder of the A.G.P. expedite commands even though the A.G.P. expedite commands were received and queued by the north bridge before the other command. This indicates that a throttling of the expedite priority has occurred.

Since such throttling is not discussed or required by the A.G.P. specification, the illustrated sequence of events indicates the presence of the throttling feature which is beyond the feature set required for the specification. One caveat, however, is that the A.G.P. expedite commands may need to be read commands to distinguish behavior that might occur in an A.G.P. specification-compliant north bridge without high priority command throttling.

A system simply complying with the A.G.P. specification may execute a non-expedited command before a high priority write command which is technically received by the north bridge before non-expedited command. This can occur if the received high priority write is not ready for execution due to lack of data, and the other (non-high-priority) command is at that time available and is therefore executed. Thus, at least where the high priority A.G.P. commands are read commands, the method of FIG. 4 represents a sequence which does not occur without a throttling mechanism within the scope of the present invention.

The method and apparatus of the present invention provides a method and apparatus for throttling high priority memory accesses in a variety of contexts. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
    an arbiter circuit coupled to receive a first type of memory access command and a second type of memory access command, the arbiter circuit having a preference for memory access commands of the first type over memory access commands of the second type; and
    a throttling circuit coupled to the arbiter circuit to periodically reduce the preference for memory access commands of the first type, by "and to provide" a first phase in which a plurality of memory access commands of the first type are interleaved with another plurality of memory access commands of the second type without the preference for the first type and a second phase in which the preference for the first type is observed despite multiple available memory access commands of the second type.

2. The apparatus of claim 1 wherein the throttling circuit comprises:
    a throttling timer which produces a throttling signal to periodically eliminate the preference for a plurality of memory access commands of the first type during a throttling period.

3. The apparatus of claim 1 further comprising a programmable throttling register which is programmable to either enable or disable a reduction of the preference for memory access commands of the first type by the throttling circuit.

4. The apparatus of claim 2 wherein the throttling circuit further comprises:
    a programmable throttling period register which is programmable to adjust the throttling period.

5. The apparatus of claim 1 wherein the throttling circuit further comprises:
    a throttling trigger circuit which detects a throttling start condition and enables the throttling circuit.

6. The apparatus of claim 5 wherein the throttling start condition comprises only use of the first type of memory access a predetermined number of times.

7. An apparatus comprising:
    an accelerated graphics port (A.G.P.) interface coupled to receive a plurality of A.G.P. high priority memory access commands;
    a second interface coupled to receive a plurality of memory access commands of a second type;
    a re-prioritization circuit coupled to alter the priority of the plurality of memory access commands of the second type when in a high priority command throttling mode during a predetermined duration, the high priority command throttling mode being entered in response to receiving one or more high priority commands, the high priority command throttling mode providing periodic throttling with a first phase in which a first plurality of A.G.P. high priority memory access commands are interleaved with a first plurality of memory access commands of the second type without a preference for the A.G.P. high priority memory access commands and a second phase in which the preference for A.G.P. high priority memory commands is observed despite multiple available memory access commands of the second type.

8. The apparatus of claim 7 wherein the second interface is one of a host bus interface and a peripheral components interconnect (PCI) bus interface, and wherein the memory access command of the second type is correspondingly one of a processor memory access command and a PCI bus agent memory access command.

9. The apparatus of claim 7 further comprising:
a register programmable to adjust a high priority throttling period during which high priority commands are denied high priority treatment by the re-prioritization circuit.

10. A system comprising:
a memory;
a first bus agent capable of requesting a memory access;
a second bus agent capable of requesting an expedited memory access;
a bridge circuit coupled to the memory, the first bus agent, and the second bus agent, the bridge circuit to interleave, during a first period, a first plurality of memory access requests from the first bus agent with a first plurality of expedited memory access requests from the second bus agent despite the first plurality of memory access requests and the first plurality of expedited memory access requests each having individual accesses concurrently available to the bridge circuit for selection, the bridge circuit also to select only a second plurality of expedited memory access requests during a second period at a time when at least one other memory access is available from the first bus agent, the first and the second periods periodically repeating.

11. The system of claim 10 wherein the second bus agent is an accelerated graphics port (A.G.P.) device and the expedited memory access is a high priority A.G.P. memory access.

12. A method comprising the steps of:
receiving a plurality of high priority memory access commands;
receiving a plurality of other memory access commands; and
periodically altering a relative priority level to provide a first phase in which a first plurality of high priority memory access commands are interleaved with a first plurality of other memory access commands without a preference for the high priority memory access commands and a second phase in which the preference for high priority memory access commands is observed despite multiple memory access commands of the second type.

13. The method of claim 12 wherein the step of altering comprises the steps of:
preferring, at first, the plurality of high priority memory access commands over the plurality of other memory access commands; and
altering, temporarily, a priority level for at least one of the plurality of high priority memory access commands.

14. The method of claim 13 wherein the step of altering further comprises the step of:
restoring the priority level for the plurality of high priority memory access commands.

15. The method of claim 12 wherein the step of altering further comprises the step of masking periodically the relative priority level for at least one of the plurality of high priority commands.

16. The method of claim 12 further comprising, prior to the first step of receiving, the step of enabling an expedite throttle mode.

17. The method of claim 16 wherein the step of enabling the expedite throttle mode comprises the steps of:
detecting only that a predetermined number of high priority commands have been received; and
starting a throttling timer which periodically asserts an expedite mask signal.

18. The method of claim 16 wherein the step of enabling the expedite throttle mode comprises the step of programming at least one bit in a throttling control register.

19. The method of claim 16 wherein the step of enabling comprises the step of selecting one of a plurality of clock throttling waveforms.

20. The method of claim 16 wherein the step of enabling comprises the step of selecting one of a plurality of clock throttling frequencies.

21. A method comprising the steps of:
during a throttling period:
receiving a plurality of A.G.P. high priority requests for a plurality of high priority A.G.P. memory reads;
receiving a plurality of second type requests of a second type for a plurality of second type memory access transactions after receiving the plurality of A.G.P. high priority requests for the plurality of high priority A.G.P. memory reads;
completing the plurality of high priority A.G.P. memory reads interleaved with said plurality of second type memory access transactions;
during a non-throttling period:
strictly preferring high priority A.G.P. memory reads to a plurality of other available memory reads of the second type; and
periodically repeating the throttling period and the non-throttling period.

22. The method of claim 21 wherein the request of the second type is either of PCI memory request and a processor memory request.

* * * * *

UNITED STATES PATENT AND TRADEMARK OFFICE
CERTIFICATE OF CORRECTION

PATENT NO.   : 6,199,127 B1  
DATED        : March 6, 2001  
INVENTOR(S)  : Ajanovic Page 1 of 1

It is certified that error appears in the above-identified patent and that said Letters Patent is hereby corrected as shown below:

<u>Column 8,</u>
Line 10, delete "by "and to provide"" and insert -- each period involving --.

Signed and Sealed this

Twelfth Day of March, 2002

Attest:

JAMES E. ROGAN  
*Director of the United States Patent and Trademark Office*

*Attesting Officer*